US011799675B2

(12) United States Patent
Alonso Franco et al.

(10) Patent No.: US 11,799,675 B2
(45) Date of Patent: Oct. 24, 2023

(54) METHODS TO UPDATE PFD RULES FOR APPLICATIONS AND RELATED NETWORK NODES

(71) Applicant: Telefonaktiebolaget LM Ericsson (publ), Stockholm (SE)

(72) Inventors: Esperanza Alonso Franco, Madrid (ES); Miguel Angel Puente Pestaña, Madrid (ES); Maria Luisa Mas Rosique, Tres Cantos (ES); Miguel Angel Muñoz De La Torre Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 508 days.

(21) Appl. No.: 16/972,890

(22) PCT Filed: Jul. 19, 2018

(86) PCT No.: PCT/IB2018/055401
§ 371 (c)(1),
(2) Date: Dec. 7, 2020

(87) PCT Pub. No.: WO2019/234481
PCT Pub. Date: Dec. 12, 2019

(65) Prior Publication Data
US 2021/0250192 A1    Aug. 12, 2021

(30) Foreign Application Priority Data
Jun. 8, 2018 (EP) .................................... 18382408

(51) Int. Cl.
*H04L 12/14* (2006.01)
*H04L 45/302* (2022.01)
(Continued)

(52) U.S. Cl.
CPC ........ *H04L 12/1407* (2013.01); *H04L 45/306* (2013.01); *H04L 45/34* (2013.01);
(Continued)

(58) Field of Classification Search
CPC ... H04L 12/1407; H04L 45/306; H04L 45/34; H04L 47/2441; H04L 47/2483;
(Continued)

(56) References Cited

U.S. PATENT DOCUMENTS 9,729,571 B1    8/2017 Ferguson et al.
2003/0154399 A1*    8/2003 Zuk ..................... H04L 63/1416
726/11

(Continued)

OTHER PUBLICATIONS

International Search Report and Written Opinion of the International Searching Authority, PCT/IB2018/055401, dated Feb. 1, 2019, 19 pages.
(Continued)

*Primary Examiner* — Azizul Choudhury
(74) *Attorney, Agent, or Firm* — Sage Patent Group

(57) ABSTRACT

A method may be provided to operate a first network node of a wireless communication network. The method may include receiving a request from a second network node to activate packet flow descriptor PFD extraction with respect to a session for a wireless device, and receiving application traffic for the wireless device, wherein an address is provided to route the application traffic. The method may also include determining an application identifier for the address responsive to the address for the application traffic being unknown to the first network node, and transmitting a PFD notification to the second network node, wherein the PFD notification includes the application identifier.

24 Claims, 15 Drawing Sheets

(51) Int. Cl.
  *H04L 45/00* (2022.01)
  *H04L 47/2441* (2022.01)
  *H04L 47/2483* (2022.01)
  *H04M 15/00* (2006.01)
  *H04W 4/24* (2018.01)
  *H04W 24/08* (2009.01)
  *H04W 40/02* (2009.01)

(52) U.S. Cl.
  CPC ...... *H04L 47/2441* (2013.01); *H04L 47/2483* (2013.01); *H04M 15/66* (2013.01); *H04W 4/24* (2013.01); *H04W 24/08* (2013.01); *H04W 40/02* (2013.01)

(58) Field of Classification Search
  CPC ....... H04M 15/66; H04W 4/24; H04W 24/08; H04W 40/02
  See application file for complete search history.

(56) References Cited

U.S. PATENT DOCUMENTS

| | | | |
|---|---|---|---|
| 2010/0250918 | A1 | 9/2010 | Tremblay et al. |
| 2012/0140633 | A1 | 6/2012 | Stanwood et al. |
| 2020/0084677 | A1* | 3/2020 | Yiu ...................... H04W 76/27 |
| 2021/0289390 | A1* | 9/2021 | Zhou ...................... H04L 47/20 |

OTHER PUBLICATIONS

3rd Generation Partnership Project; Technical Specification Group Services and System Aspects; Procedures for the 5G System; Stage 2 (Release 15), 3GPP TS 23.502 V15.1.0 (Mar. 2018), Mar. 27, 2018, XP051420270, 285 pages.

3rd Generation Partnership Project; Technical Specification Group Core Network and Terminals; Interface between the Control Plane and the User Plane Nodes; Stage 3 (Release 15), 3GPP TS 29.244 V15.1.0 (Mar. 2018), Mar. 27, 2018, XP051450549, 170 pages.

3rd Generation Partnership Project; Technical Specification Group Services and System Aspects; Study on encrypted traffic detection and verification (Release 16), 3GPP TR 23.787 V0.4.0 (Jun. 2018), Jun. 6, 2018, XP051535255, 46 pages.

3rd Generation Partnership Project; Technical Specification Group Services and System Aspects; System Architecture for the 5G System; Stage 2 (Release 15), 3GPP TS 23.501 V15.1.0 (Mar. 2018), 201 pages.

3rd Generation Partnership Project; Technical Specification Group Services and System Aspects; Policy and charging control architecture (Release 15), 3GPP TS 23.203 V15.2.0 (Mar. 2018), 261 pages.

3rd Generation Partnership Project; Technical Specification Group Services and System Aspects; Architecture enhancements for control and user plane separation of EPC nodes; Stage 2 (Release 15), 3GPP TS 23.214 V15.2.0 (Mar. 2018), 92 pages.

3rd Generation Partnership Project; Technical Specification Group Services and System Aspects; General Packet Radio Service (GPRS) enhancements for Evolved Universal Terrestrial Radio Access Network (E-UTRAN) access (Release 15), 3GPP TS 23.401 V15.3.0 (Mar. 2018), 405 pages.

3rd Generation Partnership Project; Technical Specification Group Services and System Aspects; Architecture enhancements for non-3GPP accesses (Release 15), 3GPP TS 23.402 V15.3.0 (Mar. 2018), 314 pages.

Fajardo et al., Internet Engineering Task Force (IETF), Request for Comments (RFC) 6733, Diameter Base Control, Oct. 2012, 152 pages.

* cited by examiner

METHODS TO UPDATE PFD RULES FOR APPLICATIONS AND RELATED NETWORK NODES

This application is a 35 U.S.C. § 371 national stage application of PCT International Application No. PCT/IB2018/055401 filed on Jul. 19, 2018, which in turns claims foreign priority to EP Patent Application No. 18382408.5, filed on Jun. 8, 2018, the disclosures and content of which are incorporated by reference herein in their entirety.

TECHNICAL FIELD

The present disclosure relates generally to the field of communications, and more particularly to wireless communication networks and related network nodes.

BACKGROUND

As part of 3GPP ($3^{rd}$ Generation Partnership Project) Release 14 SDCI (Sponsored Data Connectivity Improvements), PFDF (Packet Flow Descriptor Function) has been standardized. As part of 3GPP Release 15, a new 3GPP ENTRADE (Encrypted Traffic Detection and Verification) Work Item (3GPP TR 23.787) has been triggered. The following Functional elements and interfaces may be relevant for this disclosure.

Functional elements of a 4G ($4^{th}$ Generation) Architecture are discussed below.

The PFDF (Packet Flow Description Function) is a functional element/node which receives and manages the PFDs (Packet Flow Descriptions) associated with an application identifier(s) from the SCEF (Service Capability Exposure Function) via the Nu reference point.

PFD (Packet Flow Description) is a set of information enabling the detection of application traffic including:
  PFD ID (Identifier); and
  a 3-tuple including protocol, server-side IP (Internet Protocol) address and port number; or
  the significant parts of the URL (Uniform Resource Locator) to be matched, e.g. host name; or
  a Domain name matching criteria.

The PFDF provisions PFDs for the corresponding application identifier(s) to the PGW-C/TDF (Packet Gateway Control Plane Function Traffic Detection Function) as defined in 3GPP TS 23.203.

The PGW control plane function (PGW-C) provides the functionality of the PGW as defined by 3GPP TS 23.401 and 3GPP TS 23.402, and the PCEF (Policy Charging Enforcement Function) as defined by the 3GPP TS 23.203 except for the functions that are performed by the PGW-U (PGW user plane function).

The PGW user plane function (PGW-U) provides the UP (User Plane) functionality of the PGW. The functionality of PGW-U is defined in 3GPP TS 23.214.

The Gw reference point (Gw interface) is located between the Packet Flow Description Function (PFDF) and the Policy and Charging Enforcement Function (PCEF). However, in CUPS (Control and User Plane Separation), PGW-C and PGW-U jointly provide functionality equivalent to the functionality provided by the PCEF as defined by the 3GPP TS 23.203. Therefore, with CUPS the entity that interfaces the PFDF through the Gw interface is the PGW-C node.

As shown in FIG. 1, the Gw reference point (interface) is used to provision and/or remove PFDs from the PFDF to the PGW-C and to report the handling result of PFDs from the PGW-C to the PFDF.

Procedures over Gw reference point when the PFDF is deployed and/or management of PFDs is supported by the PGW-C may include:
  Pull mode only, or
  Push mode only, or
  Combination mode.

As shown in FIG. 2, Sxb is the reference point (interface) between PGW-C (PDN Gateway Control Plane) and PGW-U (PDN Gateway User Plane). In the present disclosure, this reference point (interface) may be referred to as Sx, which is specified in 3GPP TS 29.244.

The Sx PFD Management Procedure may be relevant for the present disclosure. The Sx PFD Management procedure may be used by the CP (Control Plane) function and UP (User Plane) function to provision PFDs to the UP function, for one or more Application Identifiers.

The information sent along with the Application Identifier (App ID) may be included in an Information Element (IE) referred to as PFD contents IE (Information Element) as shown in FIG. 3 (see, 3GPP TS 29.244, Section 8.2.39 and FIG. 8.2.39-1).

The flow-description of FIG. 3 is of type string array. The content of the string has the same encoding as the IPFilterRule AVP (Attribute Value Pairs) value as defined in IETF RFC 6733. It represents a 3-tuple with protocol, server ip and server port for UL/DL (Uplink/Downlink) application traffic.

In the 5G Architecture, there are new network functions (NFs) and interfaces. Actually, the NFs in the 5GCore follow an SBA (Service Based Architecture) architecture and communicate using Service based REST (REpresentational State Transfer) interfaces. However, with regards to the functions that may play a role in the present disclosure:
  SMF and PGW-C may be equivalent, and UPF and PGW-U may be equivalent. Also, TDF-C may merge into SMF, and TDF-U may merge into UPF. Actually, 3GPP has agreed to standardize N4 (between UPF and SMF) as an evolution of Sx specifications.
  PFDF may continue to provide PFDs to the PCEF (SMF+UPF), though moved within the 5G Network Exposure Function (NEF) which contains also the SCEF, and T8 is standardized as the exposure interface for both 4G and 5G.

FIG. 4 illustrates the 5G Architecture showing network functions involved in a PFD exchange.

Currently, PFD rules for a certain application are conveyed from the Application Service Provider ASP to the Network Service Provider NSP (through the 3GPP T8 Application Programming Interface API for PFD Management) so that the NSP detects application traffic based on that information. However, in some cases, the application may not be detected using such solutions, when the PFDs for a certain application are not provided from the ASP, for example, when:
  There is no Service Level Agreement SLA in place between ASP and NSP. This may be the case for applications where the ASPs do not support the 3GPP T8 API for PFD Management (and this could apply to applications of relevance in terms of traffic volume, traffic type, etc.).
  There is an SLA in place between ASP and NSP, but for some reason the PFDs are not updated properly, e.g. SLA may have restricted applicability and work only in some cases, e.g. non-roaming.

SUMMARY

According to some embodiments of inventive concepts, a method may be provided to operate a first network node of a wireless communication network. A request may be received from a second network node to activate packet flow descriptor PFD extraction with respect to a session for a wireless device. Application traffic for the wireless device may be received, wherein an address is provided to route the application traffic. An application identifier may be determined for the address responsive to the address for the application traffic being unknown to the first network node. A PFD notification may be transmitted to the second network node, wherein the PFD notification includes the application identifier.

According to some other embodiments of inventive concepts, a method may be provided to operate a first network node of a wireless communication network. A session creation request may be received from a second network node of the wireless communication network, wherein the session creation request relates to a session for a wireless device. A request may be transmitted to a third network node to activate packet flow descriptor PFD extraction with respect to the session for the wireless device responsive to receiving the session creation request. A PFD notification request may be received from the third network node, wherein the PFD notification request includes an application identifier relating to application traffic for the wireless device using the session.

According to some embodiments of inventive concepts, a network service provider NSP may be able to populate an NEF (PFDF) node with PFD rules for applications where there is no interaction between the NSP and the application service provider ASP.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 7:
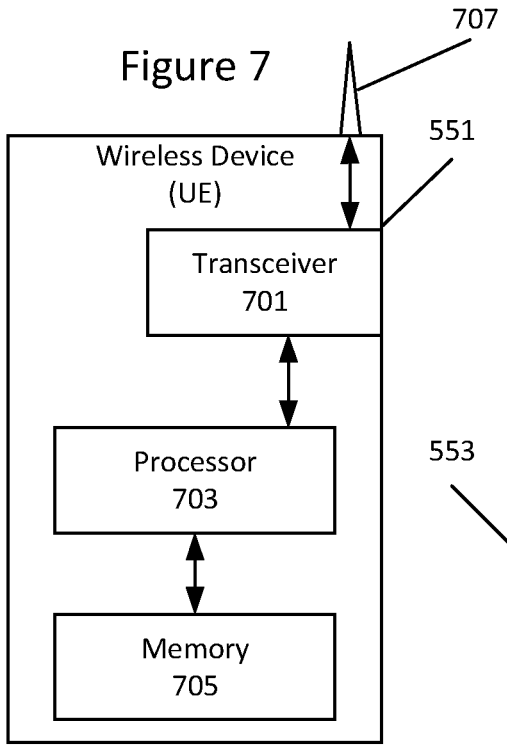
FIG. 7 is a block diagram illustrating a wireless terminal UE according to some embodiments of inventive concepts.

FIG. 7 is a block diagram illustrating elements of a wireless device UE 551 (also referred to as a wireless terminal, a wireless communication device, a mobile terminal, a wireless communication terminal, user equipment, a user equipment node/terminal/device, etc.) configured to provide wireless communication according to embodiments of inventive concepts. As shown, wireless device UE 551 may include an antenna 707, and a transceiver circuit 701 (also referred to as a transceiver) including a transmitter and a receiver configured to provide uplink and downlink radio communications with a base station node(s) of a radio access network. Wireless device UE may also include a processor circuit 703 (also referred to as a processor) coupled to the transceiver circuit, and a memory circuit 705 (also referred to as memory) coupled to the processor circuit. The memory circuit 705 may include computer readable program code that when executed by the processor circuit 703 causes the processor circuit to perform operations according to embodiments disclosed herein. According to other embodiments, processor circuit 703 may be defined to include memory so that a separate memory circuit is not required. Wireless device UE may also include an interface (such as a user interface) coupled with processor 703, and/or wireless device UE may be incorporated in a vehicle.

As discussed herein, operations of wireless device UE may be performed by processor 703 and/or transceiver 701. For example, processor 703 may control transceiver 701 to transmit communications through transceiver 701 over a radio interface to a base station node gNB and/or to receive communications through transceiver 701 from a base station node over a radio interface. Moreover, modules may be stored in memory 705, and these modules may provide instructions so that when instructions of a module are executed by processor 703, processor 703 performs respective operations.

Figure 8:
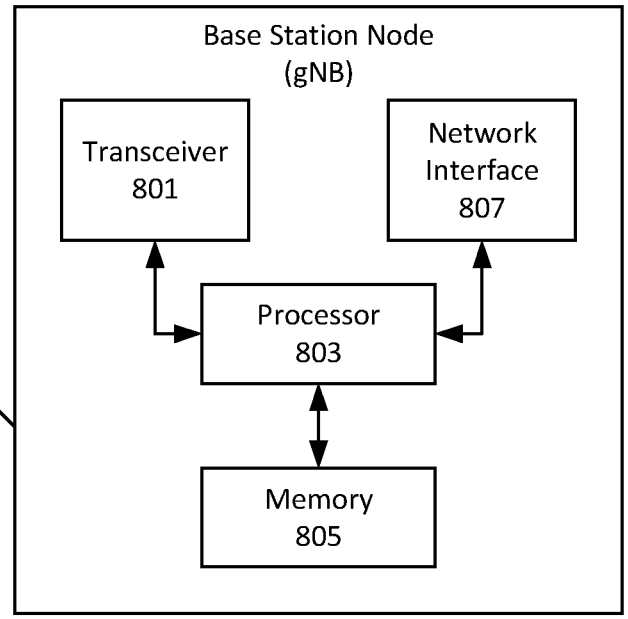
FIG. 8 is a block diagram illustrating a base station gNB according to some embodiments of inventive concepts.

FIG. 8 is a block diagram illustrating elements of a base station node (also referred to as a network node, base station, eNodeB, eNB, gNodeB, gNB, etc.) of a Radio Access Network (RAN) configured to provide cellular communication according to embodiments of inventive concepts. As shown, the base station node may include a transceiver circuit 801 (also referred to as a transceiver) including a transmitter and a receiver configured to provide uplink and downlink radio communications with wireless devices. The base station node may include a network interface circuit 807 (also referred to as a network interface) configured to provide communications with other nodes (e.g., with other base stations and/or other entities) of the RAN and/or a local area network. The base station node may also include a processor circuit 803 (also referred to as a processor) coupled to the transceiver circuit, and a memory circuit 805 (also referred to as memory) coupled to the processor circuit. The memory circuit 805 may include computer readable program code that when executed by the processor circuit 803 causes the processor circuit to perform operations according to embodiments disclosed herein. According to other embodiments, processor circuit 803 may be defined to include memory so that a separate memory circuit is not required.

As discussed herein, operations of the base station node may be performed by processor 803, network interface 807, and/or transceiver 801. For example, processor 803 may control transceiver 801 to transmit communications through transceiver 801 over a radio interface to one or more wireless devices UEs and/or to receive communications through transceiver 801 from one or more wireless devices UEs over a radio interface. Similarly, processor 803 may control network interface 807 to transmit communications through network interface 807 to one or more other network nodes/entities and/or to receive communications through network interface from one or more other network nodes/entities. Moreover, modules may be stored in memory 805, and these modules may provide instructions so that when instructions of a module are executed by processor 803, processor 803 performs respective operations.

Figure 9:
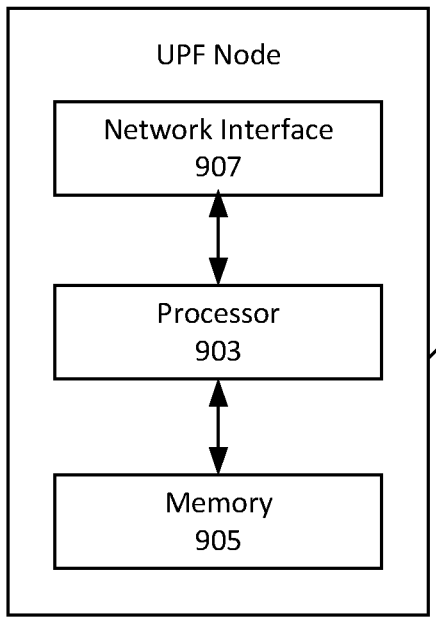
FIG. 9 is a block diagram illustrating a user plane function UPF node according to some embodiments of inventive concepts.

FIG. 9 is a block diagram illustrating elements of UPF node/entity/server 559 configured to support cellular communication according to embodiments of inventive concepts. As shown, UPF node 559 may include a network interface circuit 907 (also referred to as a network interface) configured to provide communications with other network nodes/entities/servers. The network entity may also include a processor circuit 903 (also referred to as a processor) coupled to the network interface circuit 907, and a memory circuit 905 (also referred to as memory) coupled to the processor circuit. The memory circuit 905 may include computer readable program code that when executed by the processor circuit 903 causes the processor circuit to perform operations according to embodiments disclosed herein (e.g., operations illustrated in a flow chart). According to other embodiments, processor circuit 903 may be defined to include memory so that a separate memory circuit is not required.

As discussed herein, operations of the UPF node 559 may be performed by processor 903 and/or network interface 907. For example, processor 903 may control network interface 907 to transmit communications through network interface 907 to one or more other network nodes/entities/servers and/or to receive communications through network interface from one or more other network nodes/entities/servers. Moreover, modules may be stored in memory 905, and these modules may provide instructions so that when instructions of a module are executed by processor 903, processor 903 performs respective operations. Operations of UPF node 559, for example, may be performed by one server or distributed across a plurality of network servers having the structure of FIG. 9, and a plurality of such distributed servers may be collectively referred to as a server.

Figure 10:
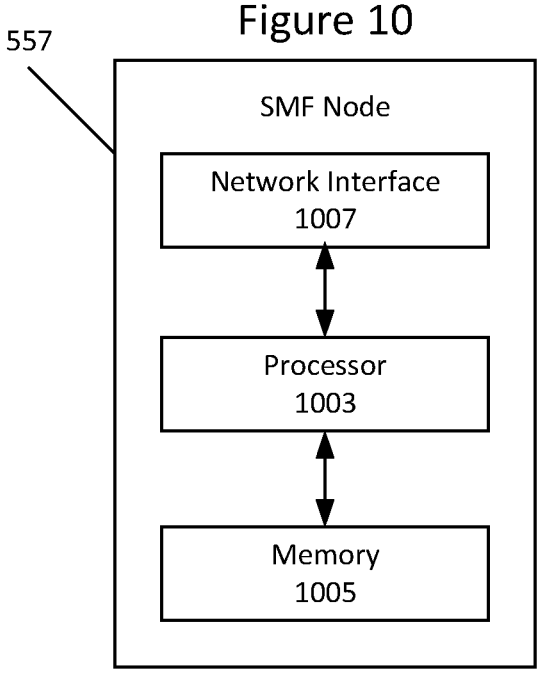
FIG. 10 is a block diagram illustrating a session management function SMF node according to some embodiments of inventive concepts.

FIG. 10 is a block diagram illustrating elements of SMF node/entity/server 557 configured to support cellular communication according to embodiments of inventive concepts. As shown, SMF node 557 may include a network interface circuit 1007 (also referred to as a network interface) configured to provide communications with other network nodes/entities/servers. The network entity may also include a processor circuit 1003 (also referred to as a processor) coupled to the network interface circuit 1007, and a memory circuit 1005 (also referred to as memory) coupled to the processor circuit. The memory circuit 1005 may include computer readable program code that when executed by the processor circuit 1003 causes the processor circuit to perform operations according to embodiments disclosed herein (e.g., operations illustrated in a flow chart). According to other embodiments, processor circuit 1003 may be defined to include memory so that a separate memory circuit is not required.

As discussed herein, operations of the SMF node 557 may be performed by processor 1003 and/or network interface 1007. For example, processor 1003 may control network interface 1007 to transmit communications through network interface 1007 to one or more other network nodes/entities/servers and/or to receive communications through network interface from one or more other network nodes/entities/servers. Moreover, modules may be stored in memory 1005, and these modules may provide instructions so that when instructions of a module are executed by processor 1003, processor 1003 performs respective operations. Operations of SMF node 557, for example, may be performed by one server or distributed across a plurality of network servers having the structure of FIG. 10, and a plurality of such distributed servers may be collectively referred to as a server.

While FIGS. 9 and 10 illustrate structures of a UPF node/entity/server and an SMF node/entity/server respectively, other network nodes/entities/servers may have the same/similar structure including a network interface, a processor, and memory. For example, such a structure including a network interface, a processor, and memory may be used for AMF node/entity/server 555, NEF (PFDF) node/entity/server 561, UDR database 563, application server 565, and/or any other node/entity/server of the wireless communication network.

Some embodiments of inventive concepts relate to Traffic Analysis and/or Classification. According to some embodiments of inventive concepts, methods may be provided to derive the PFDs from Traffic Analysis in the PGW-U/TDF-U/UPF node/nodes (or external entity) when there is no ASP/NSP interaction. The derived PFDs may be sent from PGW-U/TDF-U/UPF node/nodes (or external entity) to an NEF (PFDF) node by extending corresponding interfaces, for example, by adding an extension to the Sx/N4 interface (from 3GPP TS 29.244) and also to the interfaces which carry the PFDs towards an NEF (PFDF) node. Some embodiments may be related to the 3GPP ENTRADE Work Item (3GPP TR 23.787). Some embodiments of inventive concepts may thus relate to the Packet Core in 4G/5G and to how user data traffic classification rules (PFD) are derived and conveyed to an NEF (PFDF) node if there is no ASP/NSP interaction.

According to some embodiments, the network operator (NSP) may be allowed to populate the PFDF node with PFD rules for applications in scenarios where there is no ASP/NSP interaction. Additionally, the rules derived from PGW-U/TDF-U/UPF analysis can be added to the ones provisioned through existing T8 API for PFD Management, so that proposed solutions may also act as a complement to scenarios where there is ASP/NSP interaction. According to some embodiments, the network operator (NSP) may be allowed to convey (from a PFDF node to all PGW-U/TDF-U/UPF nodes in the network) PFD rules for applications in scenarios where there is no ASP/NSP interaction, resulting in more granular and accurate classification. According to some embodiments, the network operator (NSP) may be allowed to apply differentiated treatment for applications in scenarios where there is no ASP/NSP interaction.

Some embodiments of inventive concepts may provide mechanisms to derive the PFDs from Traffic Analysis in the PGW-U/TDF-U/UPF node/nodes (or external entity) for scenarios where there is no ASP/NSP interaction. As part of this, an extension may be added to the Sx/N4 interface (3GPP TS 29.244) and also to interfaces which carry the PFDs towards PFDF. For ease of discussion, the term UPF will be used herein to refer to both the 5G Core UP Function node and the PGW-U/TDF-U node/nodes.

Two alternatives are proposed based on which entity/node extracts the PFDs: the UPF node determining the PFDs; or other entities determining or providing the PFDs (e.g., network probe or UE).

Figure 1:
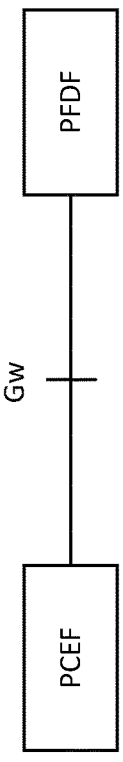
FIG. 1 is a block diagram illustrating the Gw reference point (interface) between the PCEF and the PFDF.
Figure 2:
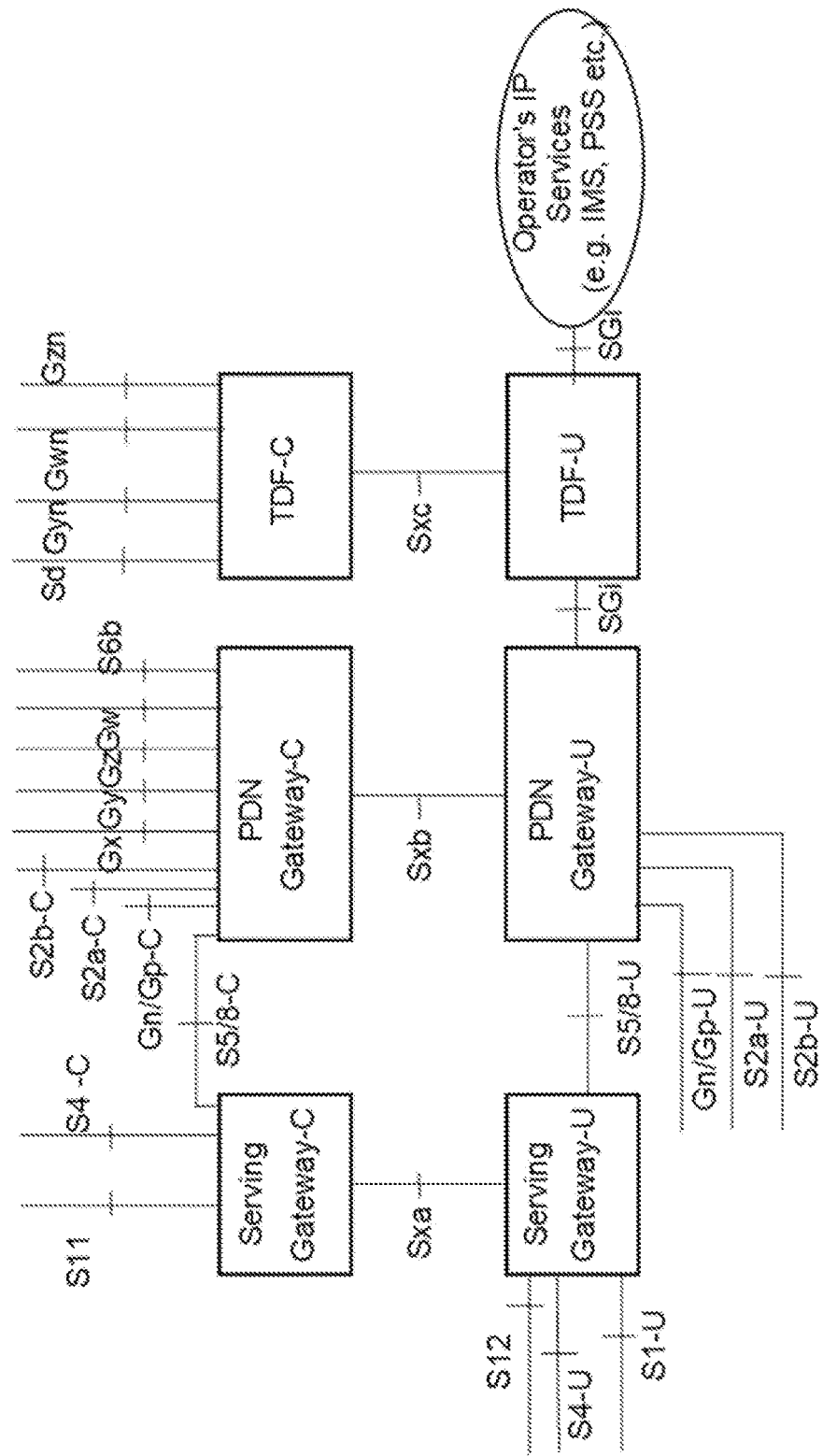
FIG. 2 is a schematic diagram illustrating network nodes and reference points (interfaces)
Figures 3, 4:
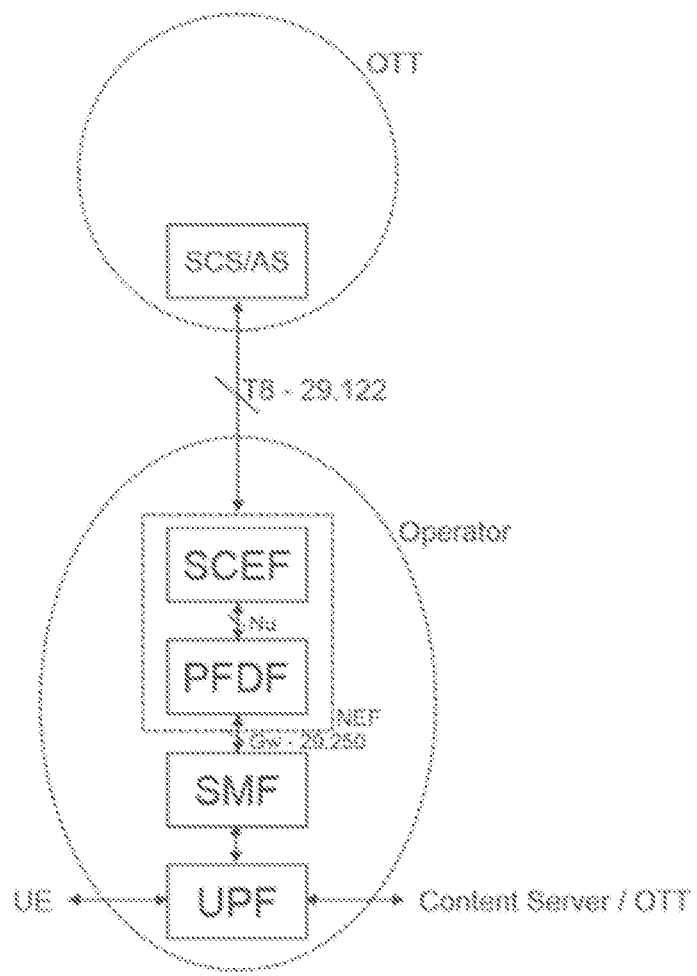
FIG. 3 provides a table illustrating information sent along with an Application Identifier in a PFD contents IE.
FIG. 4 is a schematic diagram illustrating network functions involved in a PFD exchange.
Figure 5A:
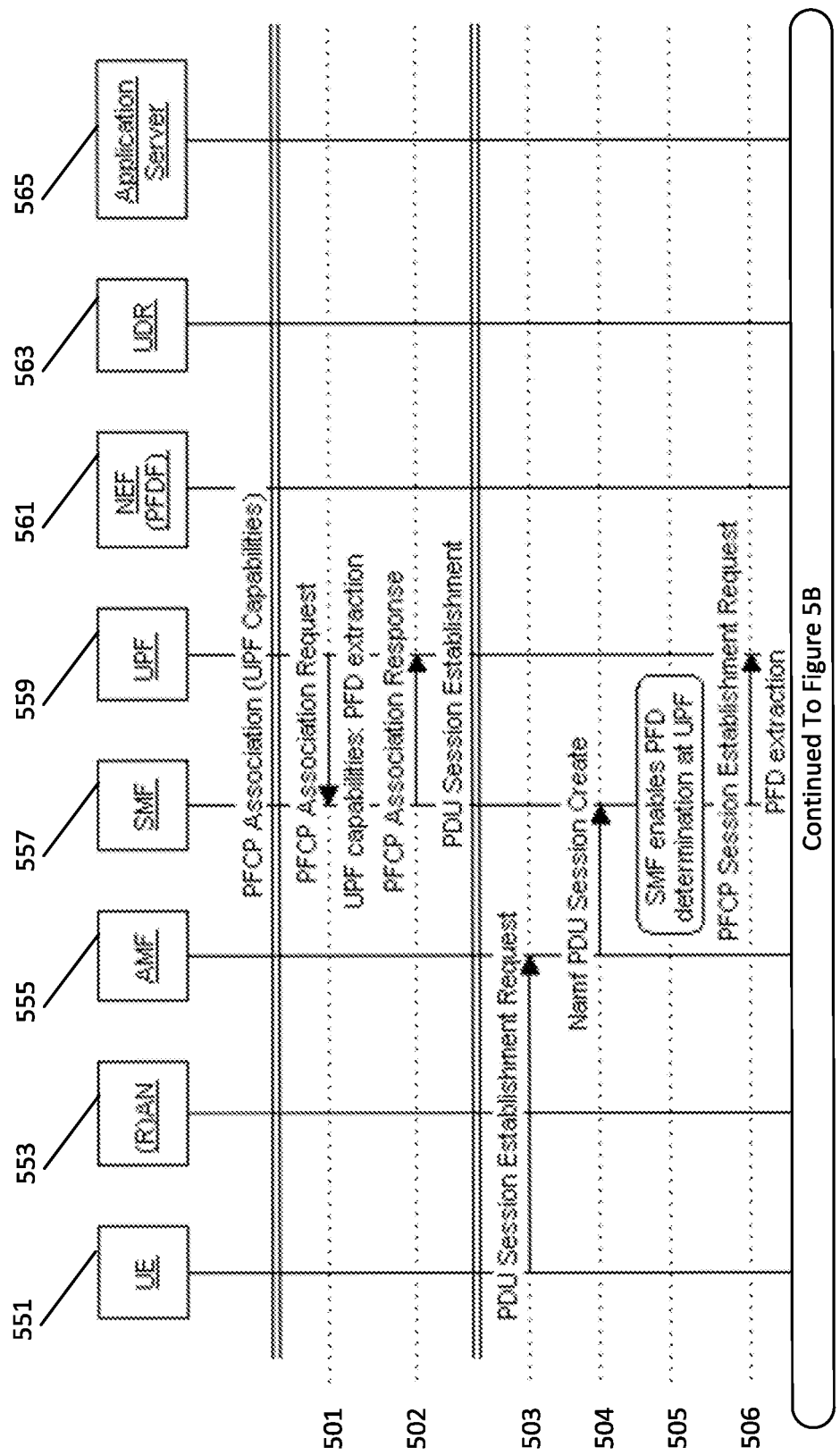
FIGS. 5A, 5B, and 5C provide a message flow diagram illustrating operations/messages to extract and/or report PFDs according to some embodiments of inventive concepts.
Figure 5B:
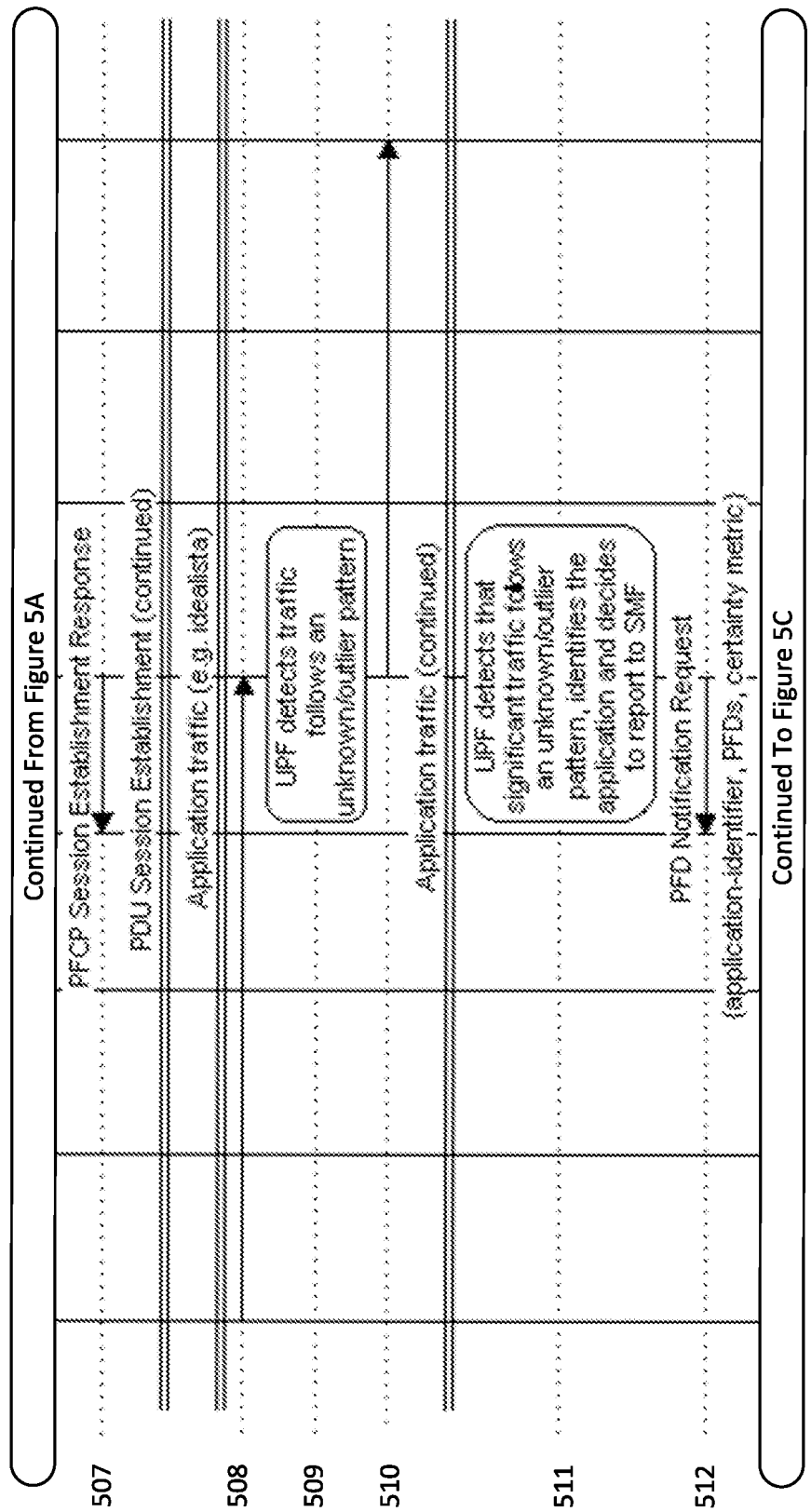
Figure 5C:
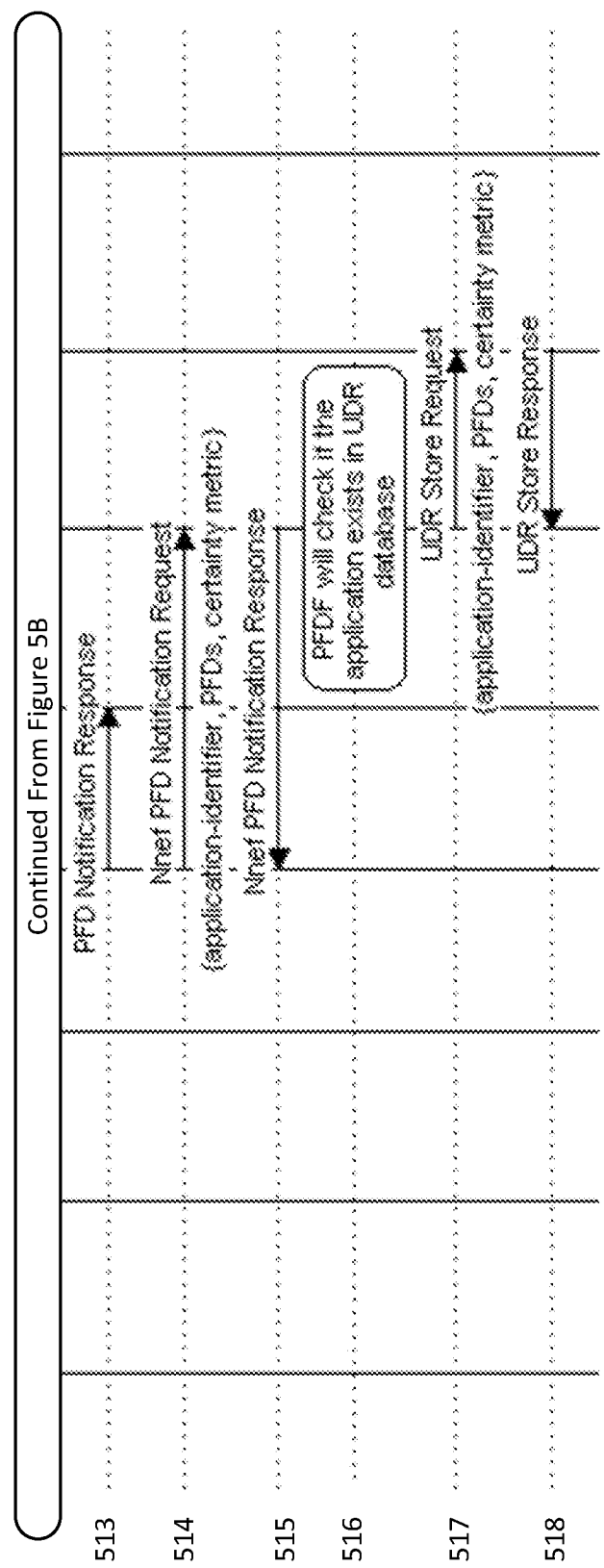

When the UPF node determines the PFDs, the message/operation of FIGS. 5A, 5B, and 5B may be performed as discussed below. FIGS. 5A, 5B, and 5C illustrate messages/operations of wireless device UE 551, radio access network (RAN) node 553 (base station), access and mobility function (AMF) node 555, session management function (SMF) node 557, user plane function (UPF) node 559, network exposure function (NEF) node 561 (also referred to as packet flow descriptor function PFDF node), user data repository (UDR) database 563, and/or application server 565.

A PFCP association procedure may be performed between UPF and SMF entities/nodes at operations 501 and 502. At operation 501, UPF node 559 may transmit a PFCP association request to SMF node 557, where the PFCP association request includes UPF capabilities of the UPF node including a PFD extraction capability. The PFCP association request of operation 501 may thus be extended to report the PFD extraction capability as a UPF capability. This may allow SMF node 557 to know which UPF nodes support the PFD extraction capability, and this information may be used by SMF node 557 to determine UPF node selection. At operation 502, SMF node 557 may transmit a PFCP association response to UPF node 559 responsive to the PFCP association request of operation 501.

A protocol data unit PDU session establishment procedure may be performed at operations 503, 504, 505, 506, and 507. At block 503, wireless device UE 551 may transmit a PDU session establishment request to AMF node 555, and responsive to the session establishment request, AMF node 555 may transmit an Namf PDU session create message to SMF node 557. At operation 505, SMF node 557 may perform UPF selection to select UPF node 559 with PFD extraction capabilities (based on the PFCP association request of operation 501 indication PFD extraction capability). At operation 506, SMF node 557 may trigger/transmit a PFCP session establishment request to UPF node 559, with the PFCP session establishment request including the packet detection rules PDRs (and enforcement actions including Forwarding Action Rules FARs, QoS Enforcement Rules QERs, Usage Reporting Rules URRs, etc.) to apply to this PDU session (i.e., the PDU session initiated by operations 503 and 504 for wireless device UE 551). In addition, the PFCP session establishment request of operation 506 may be used by SMF node 557 may indicate that UPF node 559 should apply/enable PFD extraction for this PDU session (i.e., the PDU session initiated by operations 503 and 504 for wireless device UE 551). SMF node 557 may thus enable PFD extraction on a per user PDU session basis (e.g., only for non-VIP users). According to some other embodiments, SMF node 557 may enable PFD extraction at UPF node 559 on a per node basis (i.e., for all user sessions of wireless device UE 551). At operation 507, UPF node 559 may transmit a PFCP Session Establishment Response to SMF node 557 in response to the PFCP Session Establishment Request of operation 506.

Application traffic may be handled by UPF node 559 at operations 508, 509, and 510. At operation 508, wireless device UE 551 may initiate application traffic initiate application traffic pertaining to an application (e.g., idealista) for which there is not ASP/NSP interaction (i.e., PFDF node 561 does not have PFD rules for the application traffic). At operation 509, UPF node 559 may analyze the incoming application traffic and detect that the traffic follows an unknown/outlier pattern. For example, UPF node 559 may analyze incoming traffic using 3GPP mechanisms for this PDU session of wireless device UE 551, where SMF node 557 has installed PDRs to apply by UPF node 559, and UPF node 559 may match incoming traffic for the PDU session against PDRs to classify the traffic accordingly. In the event that there is no match with any of the installed PDRs or if there is a match with a PDR that corresponds to default traffic (i.e., a PDR which if not of the type Application ID or SDF Filter), UPF node 559 may further analyze this traffic using Machine Learning techniques (e.g., Clustering) as further discussed with respect to operation 511. At operation 510, UPF node 559 may forward the application traffic to application server 565 (e.g., based on an IP address).

Responsive to detecting that a significant portion of the traffic follows an unknown/outlier pattern (e.g., classified into a cluster of like traffic that goes to a particular server Internet Protocol IP address, hostname, Transport Layer Security Server Name Identification TLS SNI, etc.), UPF node 559 may at block 511 classify this traffic as pertaining to a potential new application (with the application identifier being initially assigned as a temporary application identifier) of an application for which UPF node 559 does not have the corresponding filters (even if it is not a new application). UPF node 559 may identify which specific application (or application type, e.g., video) the above traffic pertains to. Different techniques may be used to identify the application or application type. For example, in the event that traffic goes to a certain server IP address, UPF node 559 may trigger a reverse Domain Name System DNS query to identify the target domain (e.g., reverse DNS to IP a.b.c.d may return the domain name "idealista.com"), so that this traffic may be identified (e.g., as Application ID=idealista). UPF node 559 may also identify PFD rules that result in classifying this traffic into this application identifier. Application identifier (app-ID) resolution is further discussed below with respect to FIG. 6.

At operation 512, UPF node 559 may transmit a PFD notification request to SMF node 557 through N4 (e.g., by extending N4 with a PFD Notification Request/Response procedure). The PFD notification request may include the application identifier applied to the traffic at operation 511 and PFD rules applicable to the respective application identifier. In addition, the PFD notification request may include a certainty metric (also referred to as an accuracy metric), with the certainty metric defining a certainty that the traffic belongs to a separate cluster and/or a certainty that the traffic is associate with a new application. At operation 513, SMF node 557 may transmit a PFD notification response to UPF node 559 (in response to the PFD notification request).

At operation 514, SMF node 557 may transmit an Nnef PFD Notification Request including some or all of the information from the PFD notification request of operation 512 to NEF (PFDF) node 561 through a (5G) Gw interface (e.g., by creating a new Nnef Notification Request/Response procedure to populate PFDF with PFD rules from SMF node 557). For example, the Nnef PFD Notification Request may include the application identifier and the PFD rules from the PFD notification request of operation 512. IN addition, the Nnef PFD Notification Request may include the certainty metric from the PFD notification request of operation 512. At operation 515, NEF (PFDF) node 561 may transmit a Nnef PFD Notification Response to SMF node 557 in response to the Nnef PFD notification request of operation 514.

At operation 516, NEF (PFDF) node 561 may check if existing application identifiers in UDR (User Data Repository) database 563 to determine if the application identifier of operations 512 and 514 matches an existing application identifier in UDR database 563. In the event that the application identifier (of operations 512 and 514 does not match an existing application identifier in UDR database 563, NEF (PFDF) node 561 may proceed with operations 517 and 518 to store the new application identifier, the corresponding PFD rules, and/or the certainty metric in UDR database 563. In particular, NEF (PFDF) node 561 may transmit a UDR store request at operation 517 including the application identifier, the PFD rules, and/or the certainty metric of operations 512 and 514, and UDR database 563 may store the information from the UDR store request of operation 517. At operation 518, UDR database 563 may transmit a UDR store response to NEF (PFDF) node 561 in response to the UDR store request of operation 517.

The certainty metric can be used in the event that NEF (PFDF) node 561 receives PFDs for the same application from different UPF nodes. In this case, NEF (PFDFP node 561 may aggregate the PFDs (e.g., to store only the PFDs with higher certainty metrics). In an alternative, NEF (PFDF) node 561 may store a source parameter in UDR database 563, with the source parameter indicating how the PFDs for the respective application were obtained (e.g., "source=asp" in case the PFDs were obtained directly from ASP, or "source=upf" in case the PFDs are derived by UPF node 559, for example, by machine learning). Because application identifiers received from the application service provider ASP may have different naming (e.g., if no specific naming convention is followed) compared with the application identifiers generated by UPF node 559, additional/extra logic/processing may be used/required (e.g., by conveying the domain name along with the application identifier, so that domain names may be compared). In addition, rules for existing application identifiers may be updated, for example, to add an server IP address/addresses for newly discovered servers hosting known applications (e.g., Facebook). These rules derived by UPF node 559 analysis can be added to rules provisioned through existing T8 API for PFD management, so that this mechanism may also act as a complement to a scenario where ASP/NSP collaboration is in place.

While not shown in the diagram of FIGS. 5A-C, once the PFDs have been stored in UDR database 563 as discussed above with respect to operations 516, 517, and 518, 3GPP mechanisms may be used to distribute the application identifier/identifiers and PFD rules from NEF (PFDF) node 561 to SMF node 557 and/or UPF node 559 in the wireless communication network (e.g., to provide a more granular and/or accurate classification.

Figure 6:
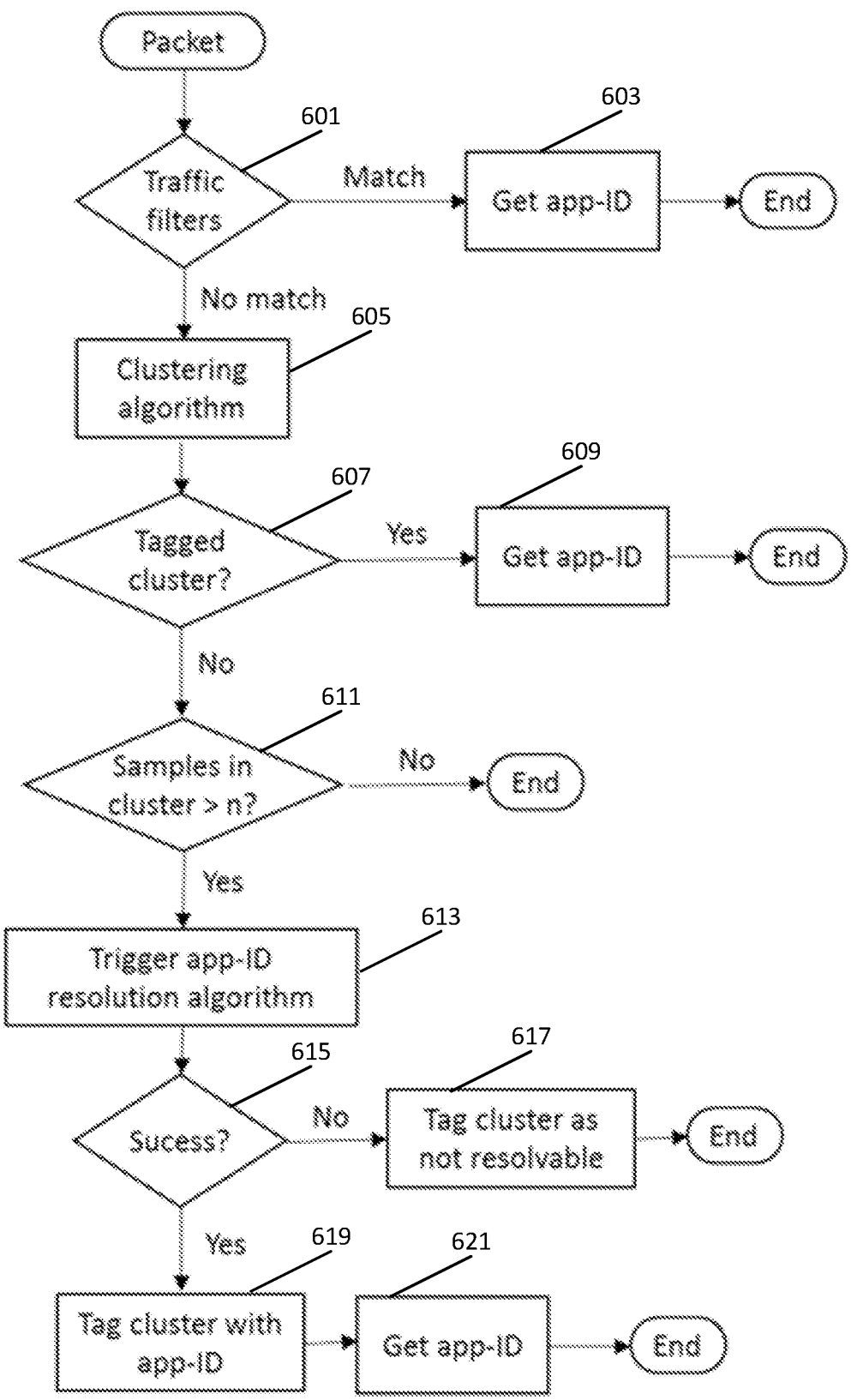
FIG. 6 is a flow diagram illustrating application identifier resolution according to some embodiments of inventive concepts.

FIG. 6 is a flow diagram illustrating application identifier resolution according to some embodiments of inventive concepts. For example, operations of FIG. 6 may be performed by UPF node 559 at operations 509 and/or 511 from the diagram of FIGS. 5A-C.

At block 601, UPF node processor 903 may analyze a packet to see if it matches existing traffic filters (also referred to as packet detection rules PDRs). Responsive to the packet matching any existing traffic filters at block 601, an application identifier (app-ID) is already associated with the respective traffic filter, and processor 903 may retrieve the application identifier at block 603, and use the application identifier to process the packet.

Responsive to the packet failing to match any existing traffic filters at block 601, processor 903 may analyze and classify the packet into a cluster at block 605 using clustering (e.g., using a clustering algorithm). Responsive to the packet being classified into a cluster that has been previously tagged with an application identifier at block 607, processor 903 may retrieve the application identifier associated with the cluster at block 609 and use the application identifier to process the packet.

Responsive to the packet being classified into a cluster that has not been previously tagged with an application identifier at block 607, processor 903 may proceed to block 613 to resolve an application identifier for the untagged cluster. At block 613, if there is a threshold number of samples (of packets) in the untagged cluster (n, statistically configured), application identifier resolution may be triggered (e.g., reverse DNS look-up). Responsive to an application identifier being unresolvable at block 615, processor 903 may tag the cluster as unresolvable at block 617, and processor 903 may avoid triggering application identifier resolution for this cluster in the future. Responsive to an application identifier being correctly resolved for the cluster at block 615, processor 903 may tag the cluster with the resolved application identifier at block 619, and at block 621, processor 903 may use the application identifier to process the packet.

According to some embodiments, other nodes/entities (e.g., a network probe) may be used to determine PFDs. According to such embodiments, SMF node 557 may configure UPF node 559 to duplicate and forward a certain percentage of traffic (e.g., 1%) to the target node/entity (e.g., a network probe). This may be performed by configuring a FAR (Forwarding Action Rule) with Apply Action parameter set to Duplicate and routing this traffic to the network probe. The network probe node/entity may analyze the traffic in the same way as described above with respect to UPF node 559, and the resulting PFDs and application identifiers (and certainty metric) may be sent towards NEF (PFDF) node 561 through an SBA based interface (e.g., as discussed with respect to Nnef PFD Notification Request/Response in Steps 14 and 15 above).

According to some other embodiments, wireless device UE 551 may directly provide the application identifier and PFDs (e.g., 5-tuple of the transmission control protocol TCP connection) to UPF node 559 (e.g. through sideband signaling). Once UPF node 559 receives this information, UPF node 559 may use the PFD Notification Request described in operation 12 of FIG. 5B to pass this information to SMF node 557, and from there SMF node 557 may provide the information to NEF (PFDF) node 561 and/or UDR database 563, for example, using operations 12 to 18 in FIGS. 5B and 5C above.

According to some embodiments of inventive concepts, methods may be provided to derive PFDs from Traffic Analysis in a UPF node (or external node/entity) when there is no ASP/NSP interaction. The derived PFDs may be sent from the UPF node (or external node/entity) to a NEF (PFDF) node by extending corresponding interfaces. Although cloud implementations are not required, some embodiments (and/or elements thereof) may be implemented in a network cloud.

Operations of UPF node 559 (also referred to as a UPF entity/server) of a wireless communication network will now be discussed with reference to the flow chart of FIG. 11. For example, UPF node 559 may be implemented using the structure of FIG. 9 with modules stored in memory 905 so that the modules provide instructions so that when the instructions of a module are executed by processor 903, processor 903 performs respective operations. Processor 903 of UPF node 559 may thus transmit and/or receive communications to/from one or more other network nodes/entities/servers of a wireless communication network through network interface 907.

At block 1101, processor 903 may transmit a packet flow control protocol PFCP association request through network interface 907 to SMF node 557 as discussed above with respect to operation 501 of FIG. 5A, and the PFCP association request may include an indication that the UPF node 559 has a PFD extraction capability. At block 1103, processor 903 may receive a PFCP association response through network interface 907 as discussed above with respect to operation 502 of FIG. 5A.

At block 1105, processor 903 may receive a PFCP session establishment request from SMF node 557 through network interface 907 to activate packet flow descriptor PFD extraction with respect to a session for wireless device 551 as discussed above with respect to operation 506 of FIG. 5A. Moreover, the PFCP session establishment request may be received after transmitting the PFCP association request.

At block 1107, processor 903 may transmit a PFCP session establishment response through network interface 907 to SMF node 557 as discussed above with respect to operation 507 of FIG. 5B. At block 1109, processor 903 may receive application traffic for the wireless device 551 through network interface 907 as discussed above with respect to operation 508 of FIG. 5B, and an address (e.g., an Internet Protocol IP address) may be provided to route the application traffic. Receiving the application traffic may include receiving the application traffic from a plurality of wireless devices using the address to route the application traffic for the plurality of wireless devices.

At block 1111, processor 903 may detect that the application traffic of block 1109 flows to an unknown or outlier pattern as discussed above with respect to operation 509 of FIG. 5B. At block 1113, processor 903 may transmit the application traffic through network interface 907 toward the application server 565 as discussed above with respect to operation 510 of FIG. 5B.

At block 1115, processor 903 may determine an application identifier for the address responsive to the address for the application traffic being unknown as discussed above with respect to operation 511 of FIG. 5B. Determining the application identifier may include clustering application traffic using the address from the plurality of wireless devices to provide a cluster of packets from the application traffic responsive to receiving the application traffic from the plurality of wireless devices using the address and determining the application identifier responsive to the cluster of packets exceeding a threshold number of packets. Moreover, determining the application identifier may include initiating application identifier resolution. The address may include an IP address, and the application identifier may include a domain name.

At block 1117, processor 903 may transmit a PFD notification through network interface 907 to SMF node 557 as discussed above with respect to operation 512 of FIG. 5B, and the PFD notification may include the application identifier. In addition, the PFD notification may include a PFD rule associated with the application identifier and/or a certainty metric relating to a certainty that the application identifier is associated with the address. At block 1119, processor may receive a PFD notification response from SMF node 557 through network interface 907 as discussed above with respect to operation 513 of FIG. 5B.

Figure 11:
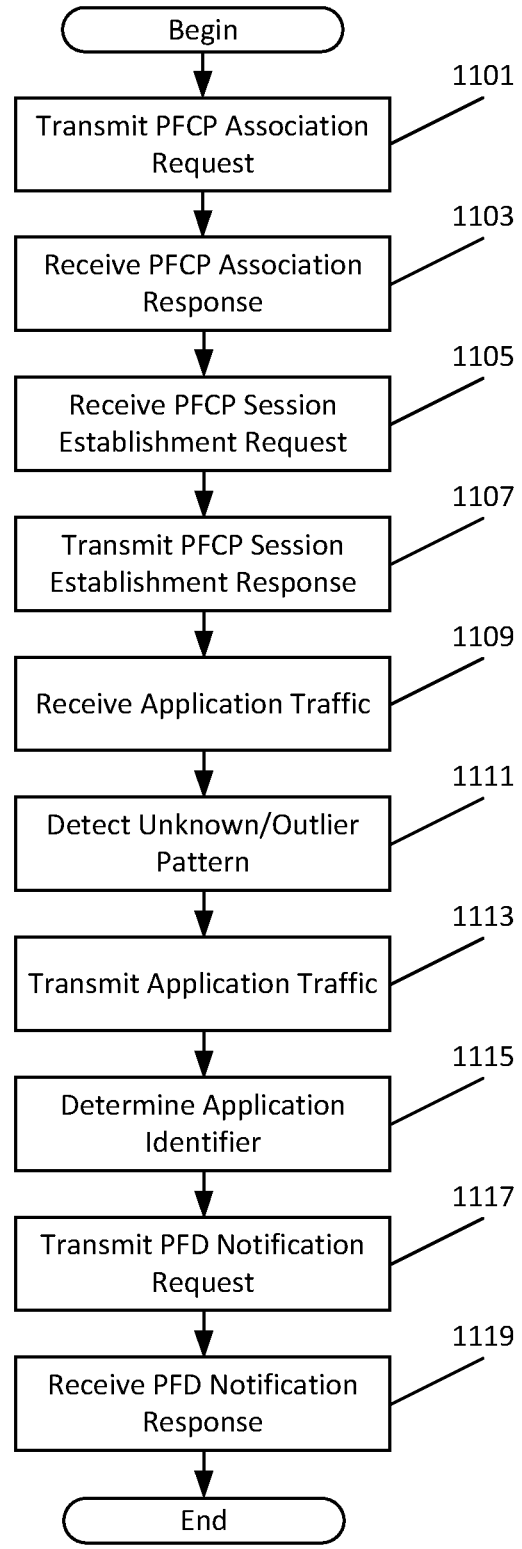
FIG. 11 is a flow diagram illustrating operations of a UPF node according to some embodiments of inventive concepts.

Various operations of FIG. 11 may be optional with respect to some embodiments. For example, operations of blocks 1101, 1103, 1107, 1111, 1113, and 1119 of FIG. 11 may be optional according to some embodiments.

Operations of SMF node 557 (also referred to as a SMF entity/server) of a wireless communication network will now be discussed with reference to the flow chart of FIG. 12. For example, SMF node 557 may be implemented using the structure of FIG. 10 with modules stored in memory 1005 so that the modules provide instructions so that when the instructions of a module are executed by processor 1003, processor 1003 performs respective operations. Processor 1003 of SMF node 557 may thus transmit and/or receive communications to/from one or more other network nodes/entities/servers of a wireless communication network through network interface 1007.

At block 1201, processor 1003 may receive a packet flow control protocol PFCP association request from UPF node 559 through network interface 1007 as discussed above with respect to operation 501 of FIG. 5A. Moreover, the PFCP association request may include an indication that UPF node 559 has a PFD extraction capability. At block 1203, processor 1003 may transmit a PFCP association response to UPF node 559 as discussed above with respect to operation 502 of FIG. 5A.

At block 1205, processor 1003 may receive a Namf PDU session create request from AMF node 555 through network interface 1007 as discussed above with respect to operation 504 of FIG. 5A, and the Namf PDU session create request may relate to a session for wireless device 551. At block 1207, processor 1003 may enable PDF determination at UPF node 559 based on having received the PFCP association request as discussed above with respect to operation 505 of FIG. 5A.

At block 1209, processor 1003 may transmit a PFCP session establishment request through network interface 1007 to UPF node 559 responsive to receiving the session creation request as discussed above with respect to operation 506 of FIG. 5A. The PFCP session establishment request may be transmitted to activate packet flow descriptor PFD extraction with respect to the session for wireless device 551. Moreover, processor 1003 may transmit the PFCP session establishment request to UPF node 559 responsive to receiving the Namf PDU session creation request of block 1205 and responsive to receiving the PFCP association request of block 1201.

At block 1211, processor 1003 may receive a PFCP session establishment response as discussed above with respect to operation 507 of FIG. 5B. At block 1213, processor 1003 may receive a PFD notification request from UPF node 559 through network interface 1007 as discussed above with respect to operation 512 of FIG. 5B. The PFD notification request may include an application identifier (e.g., a domain name) relating to application traffic for wireless device 551 using the session. In addition, the PDF notification may include a PFD rule associated with the application identifier and/or a certainty metric relating to a certainty that the application identifier is associated with an address for the application traffic for wireless device 551 using the session.

At block 1215, processor 1003 may transmit a PFD notification response through network interface 1007 to UPF node 559 as discussed above with respect to operation 513 of FIG. 5C. At block 1217, processor 1003 may transmit an Nnef PDF notification request through network interface 1007 to NEF (PFDF) node 561 as discussed above with respect to operation 514 of FIG. 5C. The Nnef PDF notification request of operation 1217 may be transmitted responsive to receiving the PFD notification of operation 1213, and the Nnef PDF notification may include the application identifier. At block 1219, processor 1003 may receive an Nnef PDF notification response as discussed above with respect to operation 515 of FIG. 5C.

Figure 12:
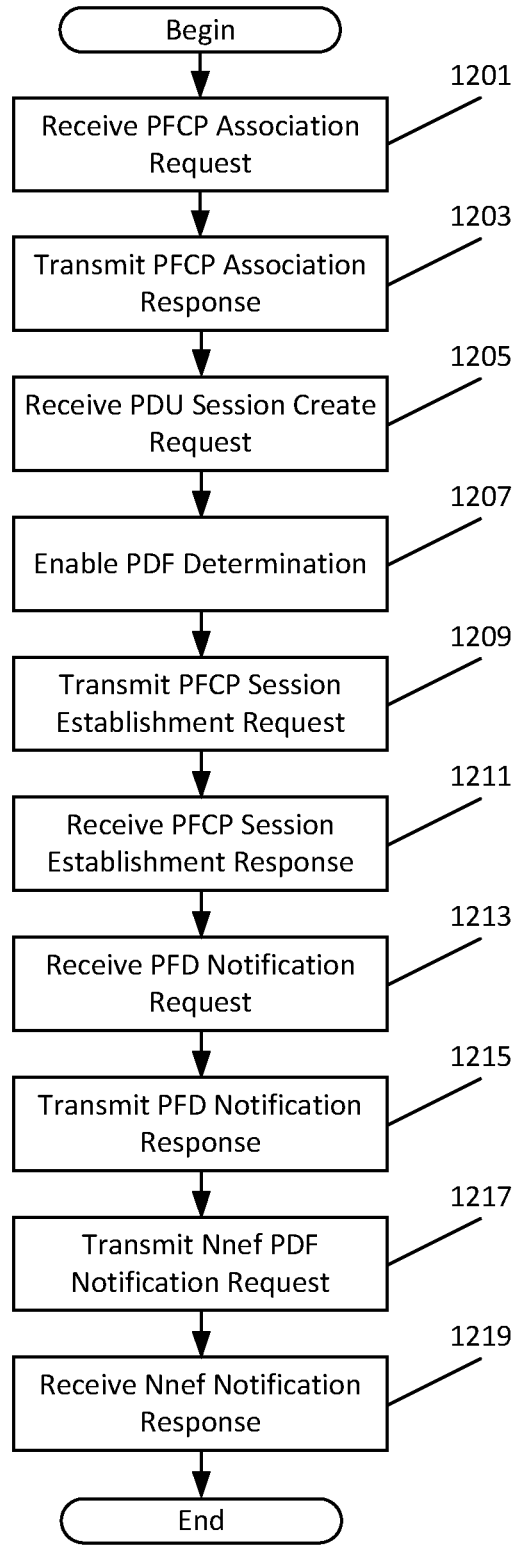
FIG. 12 is a flow diagram illustrating operations of an SMF node according to some embodiments of inventive concepts.

Various operations of FIG. 12 may be optional with respect to some embodiments. For example, operations of blocks 1201, 1203, 1207, 1211, 1215, 1217, and 1219 of FIG. 12 may be optional according to some embodiments.

Figure 13:
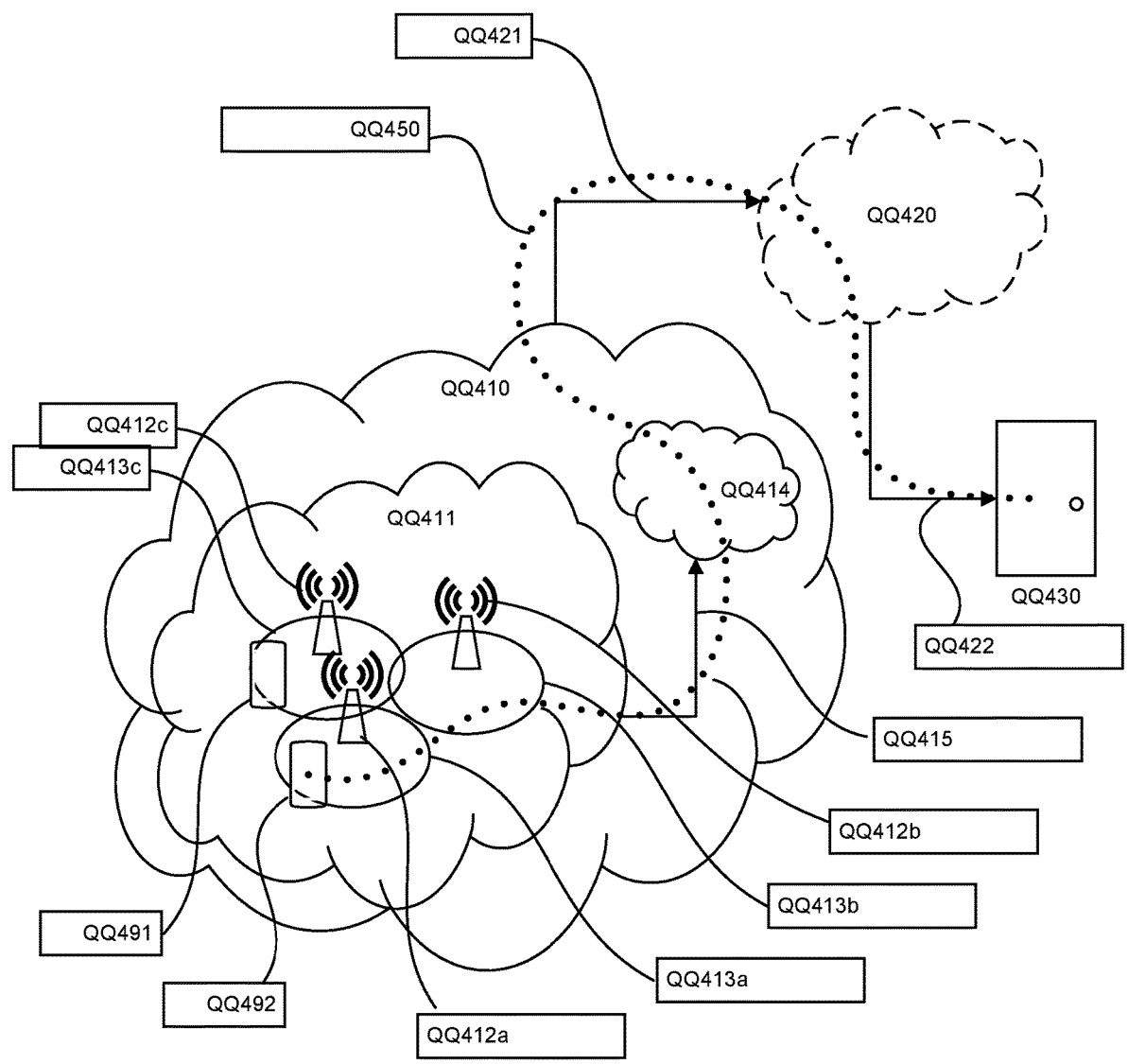
FIG. 13 is a schematic diagram illustrating a communication system according to some embodiments of inventive concepts.

With reference to FIG. 13, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 13 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 14. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 14) served by base station QQ520. Communication interface QQ526 may be configured to facilitate connection QQ560 to host computer QQ510. Connection QQ560 may be direct or it may pass through a core network (not shown in FIG. 14) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 14:
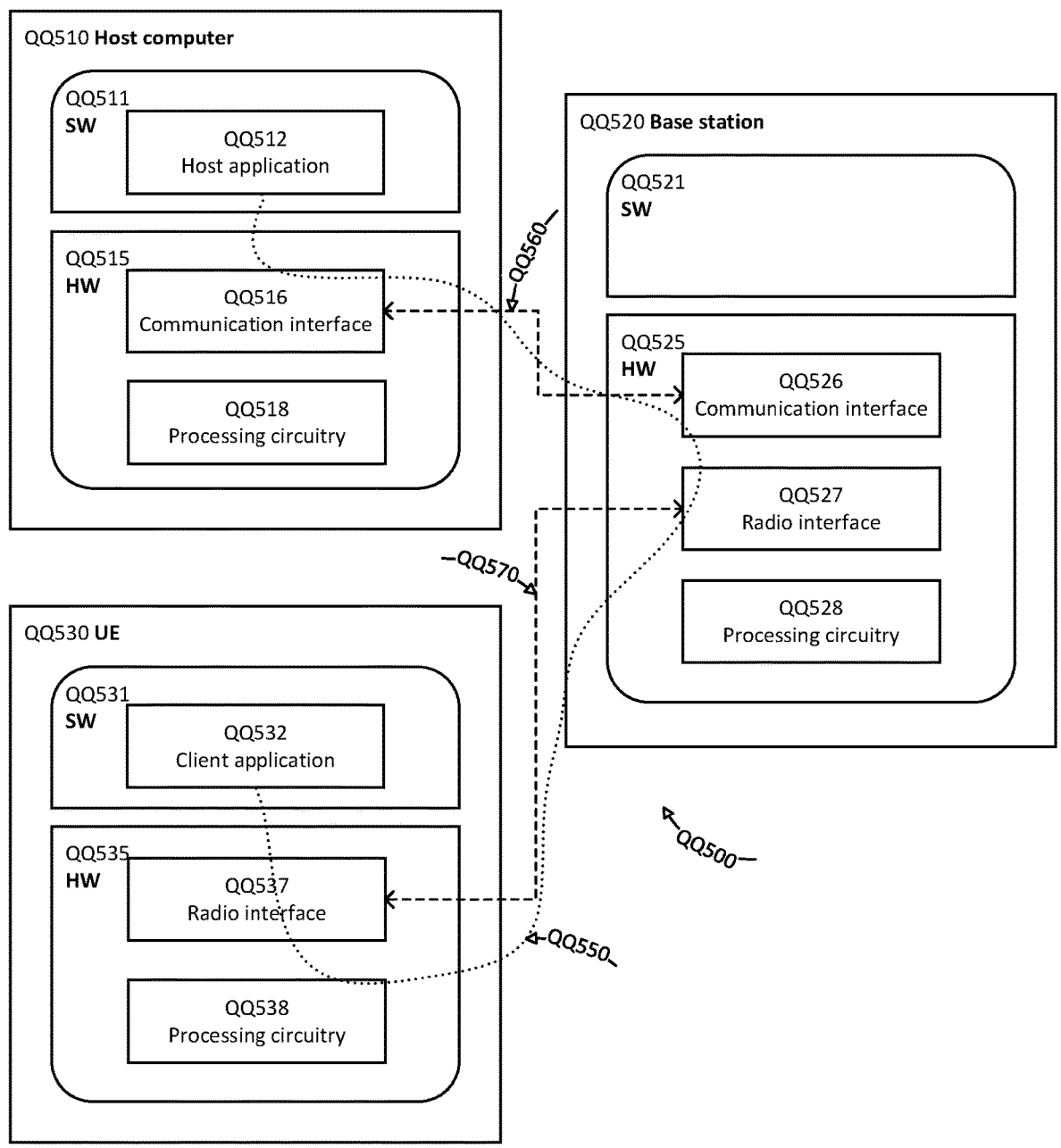
FIG. 14 is a block diagram illustrating a wireless device, a base station and a host computer according to some embodiments of inventive concepts.

It is noted that host computer QQ510, base station QQ520 and UE QQ530 illustrated in FIG. 14 may be similar or identical to host computer QQ430, one of base stations QQ412a, QQ412b, QQ412c and one of UEs QQ491, QQ492 of FIG. 13, respectively. This is to say, the inner workings of these entities may be as shown in FIG. 14 and independently, the surrounding network topology may be that of FIG. 13.

In FIG. 14, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may provide redundancy for uplink/downlink communications through the wireless communication network and thereby provide benefits such as improved reliability.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 15:
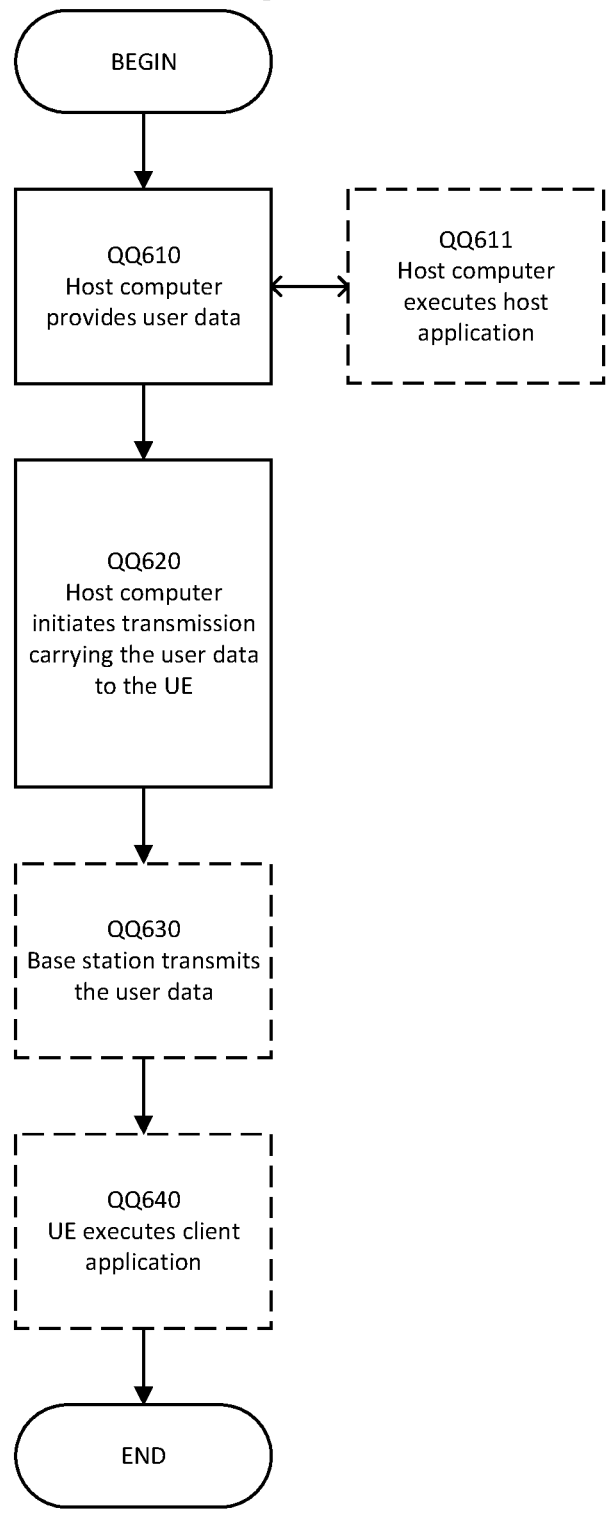
FIGS. 15, 16, 17, and 18 are flow diagrams illustrating methods in a communication system according to some embodiments of inventive concepts.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 16:
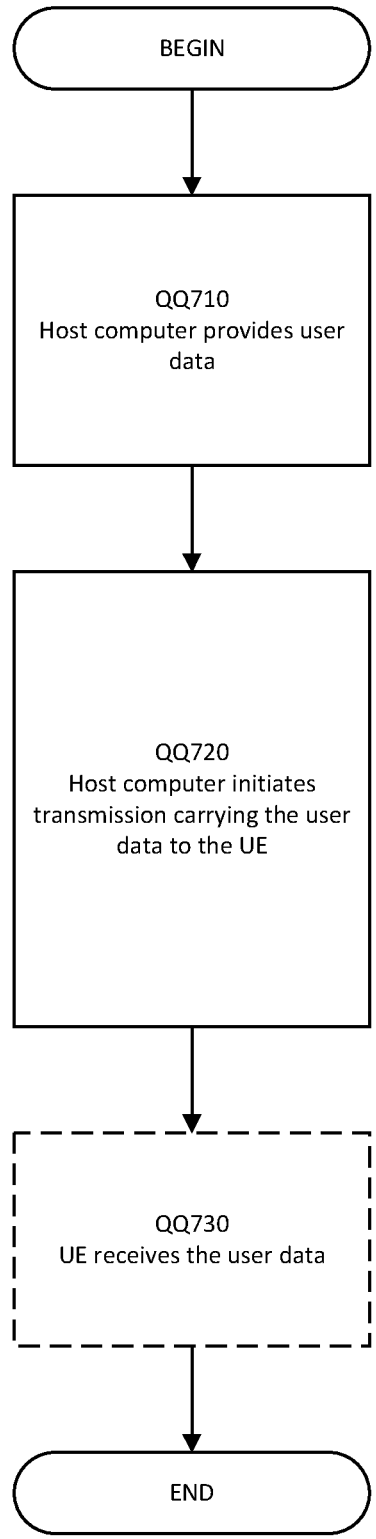

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 17:
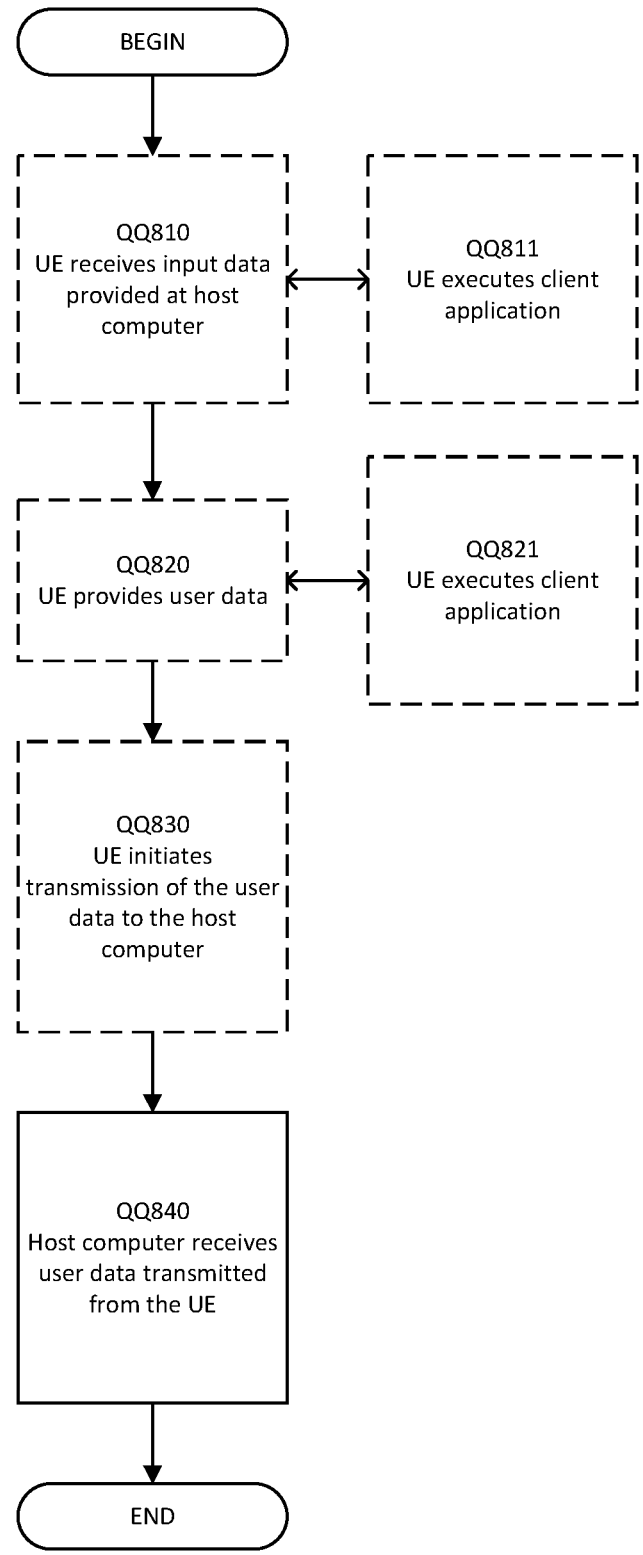

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 18:
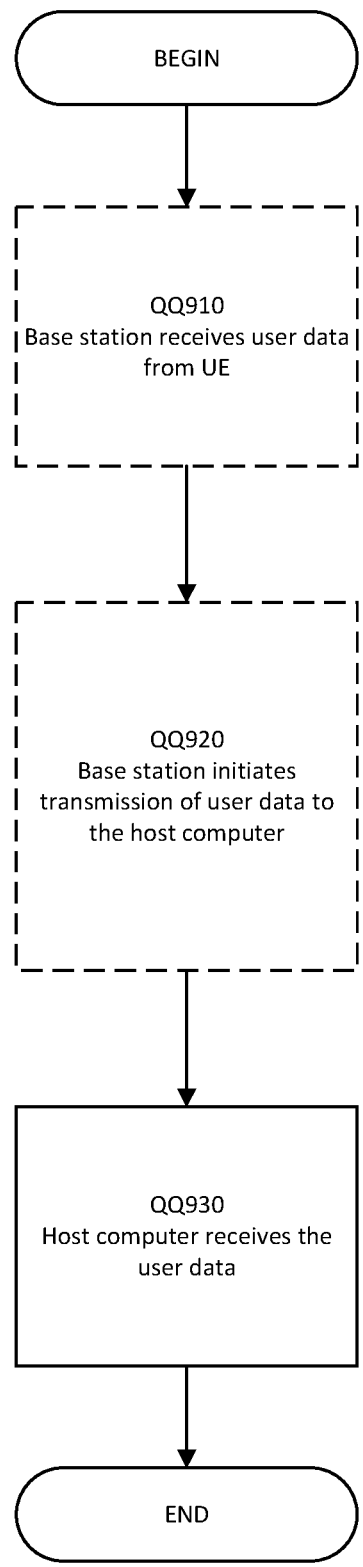

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Explanations are provided in the section below for abbreviations mentioned in the present disclosure:

| Abbreviation | Explanation |
| --- | --- |
| AMF | Access and Mobility Function |
| API | Application Programming Interface |
| AS | Application Server |
| ASP | Application Service Provider |
| AVP | Attribute Value Pair |
| CDN | Content Delivery Network |
| DPI | Deep Packet Inspection |
| ENTRADE | Encrypted Traffic Detection |

-continued

| Abbreviation | Explanation |
| --- | --- |
| HTTP | Hypertext Transfer Protocol |
| NEF | Network Exposure Functions |
| NSP | Network Service Provider |
| OTT | Over the Top Content Provider |
| PFCP | Packet Flow Control Protocol |
| PFD | Packet Flow Descriptor |
| PFDF | Packet Flow Descriptor Function |
| PGW | Packet Gateway |
| RAN | Radio Access Network |
| SCEF | Service Capability Exposure Function |
| SCS | Service Capability Server |
| SDCI | Sponsored Data Connectivity Improvements |
| SMF | Session Management Function |
| TDF | Traffic Detection Function |
| TLS | Transport Layer Security |
| UE | User Equipment |
| UPF | User Plane Function |
| URL | Uniform Resource Locator |
| VIP | Very important person |

Complete citations are provided in the section below for references mentioned in the present disclosure:

3GPP TS 23.203 V15.2.0 (2018-03), Technical Specification Group Services and System Aspects; Policy and charging control architecture (Release 15)

3GPP TS 23.401 V15.3.0 (2018-03), Technical Specification Group Services and System Aspects; General Packet Radio Service (GPRS) enhancements for Evolved Universal Terrestrial Radio Access Network (E-UTRAN) access (Release 15)

3GPP TS 23.402 V15.3.0 (2018-03), Technical Specification Group Services and System Aspects; Architecture enhancements for non-3GPP accesses (Release 15)

3GPP TS 23.214 V15.2.0 (2018-03), Technical Specification Group Services and System Aspects; Architecture enhancements for control and user plane separation of EPC nodes; Stage 2 (Release 15)

3GPP TS 29.244 V15.1.0 (2018-03), Technical Specification Group Core Network and Terminals; Interface between the Control Plane and the User Plane Nodes; Stage 3 (Release 15)

3GPP TR 23.787 V0.3.0 (2018-04), Technical Specification Group Services and System Aspects; Study on encrypted traffic detection and verification (Release 16)

Fajardo, et al., Internet Engineering Task Force (IETF), Request for Comments (RFC) 6733, Diameter Base Protocol, October 2012

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a first network node of a wireless communication network, the method comprising:
receiving a request from a second network node to activate packet flow descriptor, PFD, extraction with respect to a session for a wireless device;
receiving application traffic for the wireless device, wherein an address is provided to route the application traffic;
determining an application identifier for the address responsive to the address for the application traffic being unknown to the first network node; and
transmitting a PFD notification to the second network node, wherein the PFD notification includes the application identifier.

2. The method of claim 1,
wherein receiving application traffic comprises receiving application traffic from a plurality of wireless devices using the address to route the application traffic for the plurality of wireless devices, and
wherein determining the application identifier comprises clustering application traffic using the address from the plurality of wireless devices to provide a cluster of packets from the application traffic responsive to receiving the application traffic from the plurality of wireless devices using the address and determining the application identifier responsive to the cluster of packets exceeding a threshold number of packets.

3. The method of claim 2, wherein determining the application identifier comprises initiating application identifier resolution.

4. The method of claim 1 further comprising:
transmitting a packet flow control protocol, PFCP, association request to the second network node before receiving the request from the second network node, wherein the PFCP association request includes an indication that the first network node has a PFD extraction capability.

5. The method of claim 1, wherein where address comprises an Internet Protocol, IP, address, and wherein the application identifier comprises a domain name.

6. The method of claim 1, wherein the PFD notification further includes a PFD rule associated with the application identifier.

7. The method of claim 1, wherein the PFD notification further includes a certainty metric relating to a certainty that the application identifier is associated with the address.

8. A method of operating a first network node of a wireless communication network, the method comprising:
receiving a session creation request from a second network node of the wireless communication network, wherein the session creation request relates to a session for a wireless device;
transmitting a request to a third network node to activate packet flow descriptor, PFD, extraction with respect to the session for the wireless device responsive to receiving the session creation request; and
receiving a PFD notification request from the third network node, wherein the PFD notification request includes an application identifier relating to application traffic for the wireless device using the session.

9. The method of claim 8, wherein the PFD notification request is a first PFD notification request, the method further comprising:
transmitting a second PFD notification request to a fourth network node responsive to receiving the first PFD notification request, wherein the second PFD notification request includes the application identifier.

10. The method of claim 8 further comprising:
receiving a packet flow control protocol, PFCP, association request from the third network node before transmitting the request to the third network node, wherein the PFCP association request includes an indication that the third network node has a PFD extraction capability.

11. The method of claim 10, wherein transmitting the request to the third network node comprises transmitting the request to the third network node responsive to receiving the session creation request and responsive to receiving the PFCP association request.

12. The method of claim 8, wherein the application identifier comprises a domain name.

13. The method of claim 8, wherein the PFD notification further includes a PFD rule associated with the application identifier.

14. The method of claim 8, wherein the PFD notification further includes a certainty metric relating to a certainty that the application identifier is associated with an address for the application traffic for the wireless device using the session.

15. A first network node for a wireless communication network, the first network node comprising:
a processor; and
memory coupled with the processor, wherein the memory comprises instructions that when executed by the processor cause the processor to:
receive a request from a second network node to activate packet flow descriptor, PFD, extraction with respect to a session for a wireless device;
receive application traffic for the wireless device, wherein an address is provided to route the application traffic;
determine an application identifier for the address responsive to the address for the application traffic being unknown to the first network node; and
transmit a PFD notification to the second network node, wherein the PFD notification includes the application identifier.

16. The first network node of claim 15,
wherein receiving application traffic comprises receiving application traffic from a plurality of wireless devices using the address to route the application traffic for the plurality of wireless devices, and
wherein determining the application identifier comprises clustering application traffic using the address from the plurality of wireless devices to provide a cluster of packets from the application traffic responsive to receiving the application traffic from the plurality of wireless devices using the address and determining the application identifier responsive to the cluster of packets exceeding a threshold number of packets.

17. The first network node of claim 16, wherein determining the application identifier comprises initiating application identifier resolution.

18. The first network node of claim 15 wherein the memory further comprises instructions that when executed by the processor cause the processor to:
transmit a packet flow control protocol, PFCP, association request to the second network node before receiving the request from the second network node, wherein the PFCP association request includes an indication that the first network node has a PFD extraction capability.

19. The first network node of claim 15, wherein where address comprises an Internet Protocol, IP, address, and wherein the application identifier comprises a domain name.

20. A first network node for a wireless communication network, the first network node comprising:
a processor; and
memory coupled with the processor, wherein the memory comprises instructions that when executed by the processor cause the processor to:
receive a session creation request from a second network node of the wireless communication network, wherein the session creation request relates to a session for a wireless device;
transmit a request to a third network node to activate packet flow descriptor, PFD, extraction with respect to the session for the wireless device responsive to receiving the session creation request; and
receive a PFD notification from the third network node, wherein the PFD notification includes an application identifier relating to application traffic for the wireless device using the session.

21. The first network node of claim 20, wherein the PFD notification request is a first PFD notification, wherein the memory further comprises instructions that when executed by the processor cause the processor to:
transmit a second PFD notification request to a fourth network node responsive to receiving the first PFD notification request, wherein the second PFD notification request includes the application identifier.

22. The first network node of claim 20, wherein the memory further comprises instructions that when executed by the processor cause the processor to:
receive a packet flow control protocol, PFCP, association request from the third network node before transmitting the request to the third network node, wherein the PFCP association request includes an indication that the third network node has a PFD extraction capability.

23. The first network node of claim 22, wherein transmitting the request to the third network node comprises transmitting the request to the third network node responsive to receiving the session creation request and responsive to receiving the PFCP association request.

24. The first network node of claim 20, wherein the application identifier comprises a domain name.

\* \* \* \* \*